(12) United States Patent
Čepon et al.

(10) Patent No.: US 11,892,070 B2
(45) Date of Patent: Feb. 6, 2024

(54) WASHING MACHINE BELT PULLEY MADE OF A PLASTIC MATERIAL

(71) Applicant: Gorenje gospodinjski aparati, d.o.o., Velenje (SI)

(72) Inventors: Gregor Čepon, Horjul (SI); Uroš Koren, Polzela (SI); Blaž Starc, Ribnica (SI); Aleš Mihelič, Ljubljana (SI); Robi Pogorevc, Mislinja (SI); Miha Boltežar, Ljubljana (SI); Jože Katanec, Šoštanj (SI)

(73) Assignee: Gorenje gospodinjski aparati, d.o.o., Velenje (SI)

( * ) Notice: Subject to any disclaimer, the term of this patent is extended or adjusted under 35 U.S.C. 154(b) by 0 days.

(21) Appl. No.: 17/919,988

(22) PCT Filed: Apr. 19, 2021

(86) PCT No.: PCT/IB2021/053190
§ 371 (c)(1),
(2) Date: Oct. 19, 2022

(87) PCT Pub. No.: WO2021/214618
PCT Pub. Date: Oct. 28, 2021

(65) Prior Publication Data
US 2023/0204092 A1 Jun. 29, 2023

(30) Foreign Application Priority Data
Apr. 21, 2020 (SI) .................................. P-202000070

(51) Int. Cl.
*F16H 55/48* (2006.01)
*D06F 37/30* (2020.01)

(52) U.S. Cl.
CPC ............. *F16H 55/48* (2013.01); *D06F 37/30* (2013.01)

(58) Field of Classification Search
CPC .......... F16H 55/30; F16H 55/36; F16H 55/48; D06F 37/30
(Continued)

(56) References Cited

U.S. PATENT DOCUMENTS

| 110,247 A | * | 12/1870 | Kitson | .................... | F16F 15/34 |
| | | | | | 474/166 |
| 127,033 A | * | 5/1872 | Doane | .................... | F16H 55/38 |
| | | | | | 474/191 |

(Continued)

FOREIGN PATENT DOCUMENTS

| CN | 106958118 A | 7/2017 |
| DE | 19756516 A1 | 6/1999 |

(Continued)

OTHER PUBLICATIONS

International Search Report issued in PCT/IB2021/053190; dated Jul. 26, 2021.

*Primary Examiner* — Henry Y Liu
(74) *Attorney, Agent, or Firm* — Studebaker & Brackett PC

(57) ABSTRACT

A belt pulley of a washing machine drum made of a plastic material, comprising a hub, a circumference of the belt pulley to receive a belt, a substantially circular dividing rib dividing the belt pulley to the inner and outer concentric section with a plurality of reinforcing ribs, wherein the dividing rib is arranged on a line of a polygon having the centre in the belt pulley axis and exhibiting corners, into which, from a side facing the hub, a portion of the outermost ribs lead, said ribs being part of a plurality of reinforcing ribs of the inner section, wherein at least a portion of these ribs leading into the corners of the dividing rib run, extend along a line of polygons, preferably hexagons, which are radially arranged in the inner section and in contact with each other along one of their sides, wherein, from at least one said (Continued)

Figure 1:
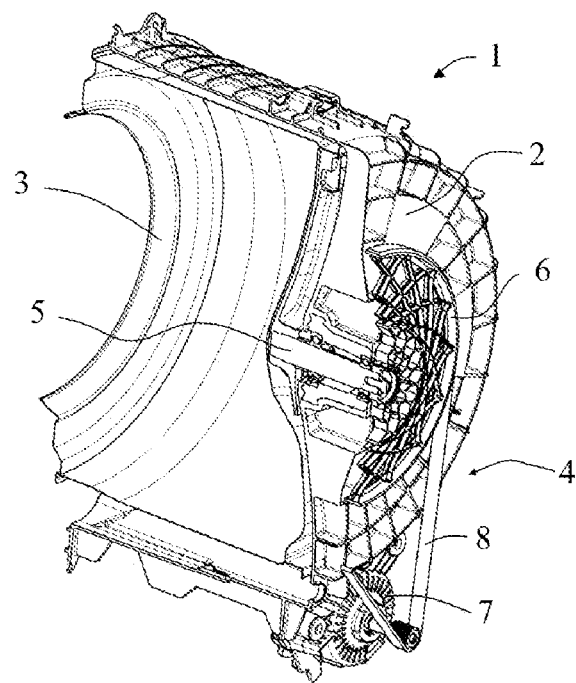

corner of the dividing rib on the side facing the outer circumference, at least one arc-shaped rib of the outer section originates, and its free end contacts the outer circumference of the belt pulley.

9 Claims, 2 Drawing Sheets

(58) Field of Classification Search
USPC .................................................. 474/190, 195
See application file for complete search history.

(56) References Cited

U.S. PATENT DOCUMENTS

| | | | | |
|---|---|---|---|---|
| 204,591 A * | 6/1878 | McManus | ............... | F16H 55/40 474/195 |
| 208,611 A * | 10/1878 | Koch | ............... | F16H 55/40 474/195 |
| 252,457 A * | 1/1882 | Hafner | ............... | F16C 17/08 474/166 |
| 278,425 A * | 5/1883 | Fulton | ............... | F16H 55/36 474/166 |
| 304,809 A * | 9/1884 | Esplin | ............... | F16H 55/06 301/5.21 |
| 512,822 A * | 1/1894 | Hoeft | ............... | F16H 55/30 474/163 |
| 580,291 A * | 4/1897 | Osmond | ............... | B62M 3/003 74/594.2 |
| 740,445 A * | 10/1903 | Langerfeld | ............... | F16H 55/30 464/82 |
| 915,829 A * | 3/1909 | Craven | ............... | F16H 55/40 301/64.203 |
| 962,620 A * | 6/1910 | Butler | ............... | F16H 55/17 474/902 |
| 1,006,262 A * | 10/1911 | Noyer | ............... | F16H 55/36 474/166 |
| 1,143,012 A * | 6/1915 | Zahniser | ............... | F16H 55/40 474/195 |
| 1,181,175 A * | 5/1916 | Shapiro | ............... | F16H 7/18 474/151 |
| 1,421,708 A * | 7/1922 | Morgan | ............... | F16D 1/076 474/166 |
| 1,638,702 A * | 8/1927 | O'Brien | ............... | F16H 55/50 474/195 |
| 1,694,350 A * | 12/1928 | Bloss | ............... | F16H 55/50 474/166 |
| 1,922,357 A * | 8/1933 | Divney | ............... | B62D 55/12 474/901 |
| 1,934,819 A * | 11/1933 | Rorabeck | ............... | B62D 55/12 474/901 |
| 1,959,570 A * | 5/1934 | Chevalier | ............... | B65H 75/20 474/171 |
| 2,101,454 A * | 12/1937 | Rogers | ............... | B60B 1/08 474/195 |
| 2,720,792 A * | 10/1955 | Zebley | ............... | B65G 23/00 301/43 |
| 3,172,195 A * | 3/1965 | Wentling | ............... | F16H 55/44 474/183 |
| 3,350,950 A * | 11/1967 | Gandrud | ............... | B62D 55/12 474/902 |
| 3,416,385 A * | 12/1968 | Schenk | ............... | F16H 55/30 474/151 |
| 3,741,025 A * | 6/1973 | Russell | ............... | F16H 55/36 474/902 |
| 4,413,981 A * | 11/1983 | White | ............... | F16H 55/50 474/902 |
| 4,490,128 A * | 12/1984 | Weiss | ............... | B60B 33/0063 474/166 |
| 4,576,587 A * | 3/1986 | Nagano | ............... | B62M 9/08 474/152 |
| 4,600,400 A * | 7/1986 | Hallerback | ............... | B66D 3/08 474/166 |
| 4,631,974 A * | 12/1986 | Wiegand | ............... | F16H 55/06 74/DIG. 10 |
| 4,704,864 A * | 11/1987 | Frotschner | ............... | F16H 41/24 60/330 |
| 4,929,220 A * | 5/1990 | Hosono | ............... | F16H 55/44 29/892.3 |
| 4,952,199 A * | 8/1990 | Saka | ............... | F16H 55/171 474/152 |
| 5,224,903 A * | 7/1993 | Langhof | ............... | B62M 9/08 474/152 |
| 5,797,819 A * | 8/1998 | Arai | ............... | F16H 55/48 474/166 |
| 5,980,407 A * | 11/1999 | Takamori | ............... | F16H 55/30 188/264 A |
| 6,099,427 A * | 8/2000 | Brown | ............... | B65G 39/073 399/343 |
| 6,139,456 A * | 10/2000 | Lii | ............... | B62M 9/10 474/158 |
| 6,817,959 B1 * | 11/2004 | Blaimschein | ............... | F16H 55/17 474/166 |
| 6,881,166 B1 * | 4/2005 | Burkhardt | ............... | F16H 55/50 474/166 |
| 7,022,037 B2 * | 4/2006 | Valle | ............... | B62M 9/10 474/152 |
| 7,083,022 B2 * | 8/2006 | McWhorter | ............... | B62M 7/02 180/218 |
| 7,435,197 B2 * | 10/2008 | Kamada | ............... | B62M 9/10 474/902 |
| 8,167,750 B2 * | 5/2012 | Hamada | ............... | F16H 55/48 474/195 |
| 9,085,846 B2 * | 7/2015 | Garlatti | ............... | F16H 55/48 |
| 9,682,713 B2 * | 6/2017 | Bacher | ............... | F16H 55/46 |
| 10,326,323 B2 * | 6/2019 | Bhargava | ............... | H02K 1/2791 |
| 2002/0086753 A1 * | 7/2002 | Yahata | ............... | B62M 9/105 474/160 |
| 2004/0110590 A1 * | 6/2004 | Renshaw | ............... | F16H 55/30 474/152 |
| 2005/0014590 A1 * | 1/2005 | Wen | ............... | F16H 55/30 474/160 |
| 2005/0192146 A1 * | 9/2005 | Marten-Perolino | ..... | F16H 55/46 474/166 |
| 2005/0233850 A1 * | 10/2005 | Andel | ............... | B62M 9/00 474/202 |
| 2006/0160647 A1 * | 7/2006 | Swane | ............... | F16H 55/36 474/166 |
| 2006/0172841 A1 * | 8/2006 | San Miguel Nunez | ............... | B65G 23/06 474/152 |
| 2006/0211529 A1 * | 9/2006 | Vergara | ............... | B62M 9/08 474/152 |
| 2006/0264286 A1 * | 11/2006 | Hodjat | ............... | F16H 55/171 474/152 |
| 2007/0093329 A1 * | 4/2007 | Greppi | ............... | F16H 55/14 474/160 |
| 2007/0173364 A1 * | 7/2007 | Renshaw | ............... | B62M 9/00 474/160 |
| 2007/0232427 A1 * | 10/2007 | Ueno | ............... | F16H 55/48 474/166 |
| 2011/0105263 A1 * | 5/2011 | Braedt | ............... | F16H 55/303 474/160 |
| 2011/0118067 A1 * | 5/2011 | Bronson | ............... | F16H 55/48 474/166 |
| 2011/0300979 A1 * | 12/2011 | Dutil | ............... | F16H 55/36 474/166 |
| 2011/0312457 A1 * | 12/2011 | Wang | ............... | F16H 55/30 474/152 |
| 2012/0065011 A1 * | 3/2012 | Kvasnicka | ............... | F02B 67/06 474/195 |
| 2013/0116074 A1 * | 5/2013 | Lin | ............... | B62M 9/00 474/152 |
| 2013/0143704 A1 * | 6/2013 | Blank | ............... | B62M 9/10 474/152 |

(56) References Cited

U.S. PATENT DOCUMENTS

| | | | | |
|---|---|---|---|---|
| 2014/0121051 A1* | 5/2014 | Dutil | .................. | F16H 55/36 |
| | | | | 474/195 |
| 2014/0221140 A1* | 8/2014 | Garlatti | .................. | F16H 55/48 |
| | | | | 474/190 |
| 2016/0010732 A1* | 1/2016 | Blevins | .................. | F16H 55/17 |
| | | | | 475/331 |

FOREIGN PATENT DOCUMENTS

| | | |
|---|---|---|
| EP | 2159314 A1 | 3/2010 |
| EP | 2756125 A1 | 7/2014 |
| IT | AN20100041 A1 | 9/2011 |
| WO | 2007/057234 A1 | 5/2007 |
| WO | 2013/038432 A1 | 3/2013 |

\* cited by examiner

WASHING MACHINE BELT PULLEY MADE OF A PLASTIC MATERIAL

SUBJECT OF INVENTION

The subject of the present invention is a belt pulley of a washing machine drum, particularly of a household washing machine, made of a plastic material.

Technical Problem

The technical problem is to configure a belt pulley of a plastic material with as low weight as possible and with mechanical properties that will prevent deformation of the belt pulley in both radial and axial directions.

Prior Art

Laundry washing in a washing machine is carried out in a drum rotatably arranged within a washing tub of the washing machine. The drum rotates by means of a drive assembly comprising a shaft fixed to the drum and mounted in bearings, a belt pulley mounted on the shaft, an electric motor with a drive shaft, and a drive belt which transmits the revolutions of the electric motor via the belt pulley to the drum.

Belt pulleys, especially in high-spin washing machines, e.g. 1400 rpm or more, and a large drum volume, e.g. 8 kg and more, are usually made of metallic materials due to high mechanical loads. A drawback of these belt pulleys is mainly their weight and also a problematic manufacturing. Therefore, attempts are being made to replace metal belt pulleys with belt pulleys made of a plastic material, which generally have poorer mechanical properties. Belt pulleys made of plastic can get deformed both during operation and at rest when they are subjected to a belt preload force and forces associated with a sufficiently strong connection of the belt pulley to the drum shaft. It is attempted to compensate for poorer strength properties of the material in particular by a more suitable shape of the connecting ribs between the hub and the tread surface of the belt pulley, on which the drive belt rests.

Thus, patent application WO/2007/057234 describes a belt pulley made of a plastic material and having a similar geometry characteristic of metal belt pulleys. The belt pulley has a central hub, an outer circumference for receiving the belt, and a plurality of radially connecting ribs. To ensure the mechanical properties that transmit forces during standstill and operation, the ribs have large cross sections, which consequently means a large weight of the belt pulley or a large amount of material used and thus higher manufacturing costs.

Patent application EP2159314 (A1) describes a belt pulley made of a plastic material, which is made of a plurality of radial ribs that are circularly connected from the central hub to the outer circumference for receiving the belt. Even with such a technical solution, the sufficient stiffness of the belt pulley is provided by the ribs of larger cross-section. As a result, such a belt pulley has a large weight and thus a huge requirement regarding the material used.

Patent application WO 2013/038432 A1 describes a belt pulley of a plastic material comprising a central hub, an outer circumference for receiving the belt, an inner section connecting several radial ribs, and an outer section containing several circumferential ribs inclined with respect to the radial ribs. Such shape of the belt pulley requires the use of special plastic materials having an elastic modulus exceeding 14,000 MPa. For this purpose, a considerable proportion of mineral or synthetic filler is added to the base material, which is precipitated at the front of the casting flow when the melt solidifies, creating weaker belt pulley spots in locations where the two flows meet, especially on the outer circumference. The large number of ribs that support the belt pulley circumference reduces the impact of weaker spots and at the same time ensures small radial deformations of the circumference and thus stable operation of the belt without periodic excitation. A disadvantage of such a belt pulley is that the ribs in the first and outer section are designed with a small cross section, which causes the belt pulley to bend in a direction outside the plane of action of radial forces. This problem can be solved with a larger number of ribs or a larger dimension of same, which increases the weight/material consumption in the manufacture.

CN 106958118 A discloses a plastic belt pulley being constructed as a plastic plate which is reinforced with radial ribs in an inner intermediate section as well as in the outer intermediate section.

To ensure a stable position and proper operation of the belt both during operation and at rest, the belt is mounted on the belt pulley with a certain preload force. As a result, the belt pulley is loaded with a constant surface pressure on the circumferential surface on which the belt rests, which causes radial forces on the belt pulley. Static loading of the belt pulley can cause permanent deformations and thus creep of the material at elevated temperatures, especially during the storage and transport phase, due to high stresses. During operation, the belt pulley can bend outside the plane of action of radial forces due to the belt preload forces. This type of bending can cause the shift of the belt on the tread of the belt pulley and in extreme cases even falling-out of the belt.

The problem of belt pulley bending is most often solved with a larger number of ribs or with ribs of larger cross-section. Such a solution brings about an increased weight of the belt pulley due to the larger amount of material used, which in turn results in a higher weight and also higher manufacturing costs.

The common disadvantage of all these solutions is that they do not allow for an optimal distribution of internal stresses in the belt pulley and thus the deformations resulting from the manufacture of the belt pulley by injection moulding.

Solution to the Technical Problem

The technical problem is solved by a belt pulley made of a plastic material and having the characteristics defined in the independent claim 1.

A belt pulley of a washing machine drum, particularly of a household washing machine, made of a plastic material, comprises a central part of the belt pulley formed as a hub, with which the belt pulley is fastened to a drum shaft; a belt pulley circumference arranged concentrically with respect to the hub and defining the belt pulley and receiving the belt on its outer surface; a substantially circular dividing rib arranged concentrically with respect to the circumference of the belt pulley so as to divide the belt pulley into two concentric sections, i.e. a first, inner section closer to the hub, and a second, outer section delimited by the circumference of the belt pulley, wherein a respective plurality of reinforcing ribs are arranged in the inner and outer sections, wherein the dividing rib is arranged on a line of a polygon having the centre in the belt pulley axis and exhibiting corners, into which, from a side facing the hub, a portion of the outermost reinforcing ribs lead, said ribs being part of a plurality of internal reinforcing ribs, wherein at least a portion of these reinforcing ribs leading into the corners of the dividing rib run, extend along a line of polygons, preferably hexagons, which are radially arranged in the inner section and in contact with each other along one of their sides, wherein, from at least one said corner of the dividing rib on the side facing the circumference, at least one arc-shaped reinforcing rib, preferably two arc-shaped reinforcing ribs, of the outer section originate, forming a pair of mirrored arc-shaped reinforcing ribs and their free ends contacting the belt pulley circumference.

The reinforcing ribs of the inner section, which run along the line of the polygons, form honeycombs, thus achieving greater radial strength of the inner section.

A pair of arc-shaped reinforcing ribs of the outer section may have an axial mirror-assigned second pair of arc-shaped ribs.

The reinforcing ribs of the outer intermediate section are arc-shaped, the size of the radius of the arc of the reinforcing rib being substantially equal to or larger than the radius of the belt pulley.

The reinforcing ribs in the inner section are arranged radially so as to form honeycombs. In this case, the honeycomb cells, which are symmetrical with respect to the belt pulley axis, are of the same dimensions. The size of the cells increases with their distance from said axis.

The high stiffness and thus the small deformations of the honeycomb under loads are also reflected in the smaller deformations of the intermediate dividing rib, the second intermediate section and also the circumference of the belt pulley itself. Radial deformations are more uniform. The result of minor radial deformations is minimized periodic excitation of the belt, which results in a more even running of the belt along the circumference of the belt pulley or the tread, which prevents the possibility of the belt falling out of the belt pulley.

Stresses and consequently deformations also occur during the cooling of the plastic material in the production of the belt pulley. The arc-shaped configuration of the reinforcing ribs contributes to the reduction in deformations, especially of the circumference of the belt pulley. When cooling, the material shrinks. Due to the arc-shaped configuration of the reinforcing ribs in the outer intermediate section, these ribs shrink or deform in such a way as that their curvature is reduced or their radius is increased. The stresses resulting from the shrinkage of the arc-shaped reinforcing ribs are transmitted to a much lesser extent to the circumference of the belt pulley and consequently the local deformations of the circumference of the belt pulley in the radial direction are greatly reduced in comparison to those that would be present in the case of straight reinforcing ribs. Due to a relatively large number of reinforcing ribs, the relative deformations of the circumference of the belt pulley are further reduced.

A further advantage of the belt pulley according to the invention is demonstrated in the injection moulding production process. In the process of injection moulding of products of circular shapes similar to that of a belt pulley, where it is necessary to maintain a centric or round shape on the circumference, the liquid material is usually fed into the mould in one place in the axis or in its immediate vicinity, wherein a unified flow of the liquid material into all parts of the mould should be provided for. The configuration of the reinforcing ribs and thus the entire belt pulley according to the invention is such that the liquid material fed in the axial direction flows throughout the flow step towards the circumference substantially in the radial direction all the way to the outer circumference of the belt pulley. Individual strands of the melt join together in the outer circumference of the belt pulley. Fillers that are present in the material and that represent the weakening spots are eliminated at the junction spots. The smaller the number of junctions, the more fillers are eliminated at such a spot. The aim is therefore to increase the number of contact points. This is achieved with the belt pulley according to the invention, because there is a large number of reinforcing ribs.

Figure 2:
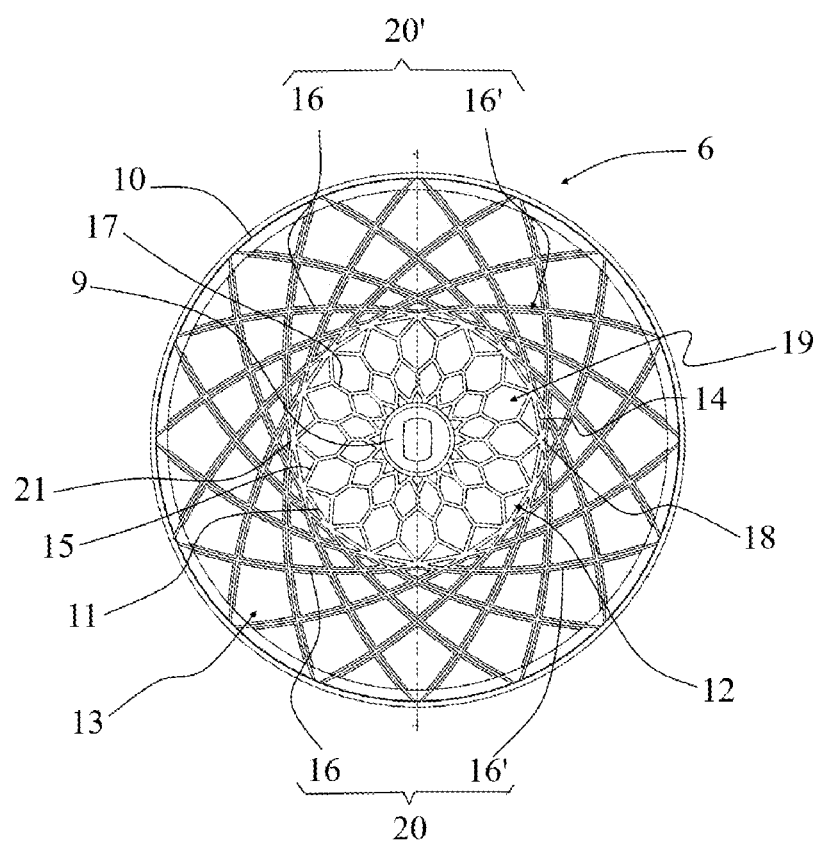

The belt pulley of the invention will be described in more detail below by way of an embodiment and drawings representing in FIG. 1 Assembly of a washing machine tub FIG. 2 Belt pulley of the invention A washing machine comprises a tub assembly 1 comprising a washing tub 2 and a drum 3 rotatably arranged therein. The drum 3 is rotated by a drive assembly 4 comprising a shaft 5 fastened to the drum 3 and mounted on bearings, which allows for a free rotation of the drum 3 around its axis, a belt pulley 6 arranged on the shaft 5, an electric motor 7 with a drive shaft and a drive belt 8 that connects the drive shaft of the electric motor 7 and the belt pulley 6, thus transferring the rotation from the electric motor 7 to the washing machine drum 3.

The belt pulley 6 of the washing machine drum comprises
- a central part 9 formed as a hub, with which the belt pulley 6 is fastened to the shaft 5;
- a belt pulley circumference 10 arranged concentrically with respect to the hub and defining the belt pulley 6 and receiving the belt 8 on its outer surface which is substantially a tread surface;
- a substantially circular dividing rib 14 arranged concentrically with respect to the circumference 10 of the belt pulley at ⅓ to ⅔ of the radius of the belt pulley circumference 10, preferably at substantially half the radius of the belt pulley circumference 10, so as to divide the belt pulley 6 into two concentric sections, i.e. an inner section 12 and an outer section 13, wherein a respective plurality of reinforcing ribs 15, 16 are arranged in the inner 12 and outer section 13.

The dividing rib 14 is arranged along the line of the polygon 11 with the centre in the axis of the belt pulley 6 and exhibits corners 21. A plurality of reinforcing ribs 15 are arranged in the inner section 12 of the belt pulley 6. A part of the reinforcing ribs 15 which are closer to the dividing rib 14 or furthest from the hub 9 converges into the corners 21 of the dividing rib 14 on the side of the corner facing the hub 9. In the embodiment, two ribs 15 of the inner section converge in each corner 21, which is not a mandatory feature. The convergence of the reinforcing ribs 15 can also be carried out in only a certain limited number of corners 21, as well as it is not mandatory for the two reinforcing ribs 15 most distant from the hub to converge into a single corner 21.

At least part of the reinforcing ribs 15 converging into the corners 21, in the embodiment all the ribs 15 converging into the corners 21, run along a line of polygons 17, preferably hexagons. The polygons 17 are radially arranged in the inner section 12 and in contact with each other along one of their sides. The ribs 15 of the inner section 12 running along the line of the polygons 17 form a honeycomb 19. The size of the cells of the honeycomb 19 increases with their distance from said axis.

A corner 21 of the dividing rib 14 forms an originating point 18 from which at least one arc-shaped rib 16 of the outer section 13 emerges, preferably two arc-shaped ribs 16, 16' so as to form a pair 20 of mirror arc-shaped reinforcing ribs 16, 16' and their free ends contact the outer circumference 10 of belt pulley 6.

In the embodiment, a second pair 20' of arc-shaped reinforcing ribs 16, 16' is axially mirrored to each pair 20 of arc-shaped reinforcing ribs 16, 16' of the outer section 13, which is not a mandatory feature.

The number of pairs 20 of arc-shaped reinforcing ribs 16, 16' in the outer section 13 is equal to the number of corners 21 of the dividing rib 14. The number of pairs 20 of reinforcing ribs 16, 16' depends on the required strength of the belt pulley 6 and increases with an increasing requirement for strength.

The ribs 16, 16' of the outer intermediate section 13 are arc-shaped, the size of the radius of the arc of the rib 16, 16' being substantially equal to or larger than the radius of the belt pulley 6.

Due to the honeycomb shape, the system of ribs formed by the ribs 15 have a high axial and radial stiffness, which ensures high stiffness of the belt pulley 6 in the inner section 12 under axial and bending loads, thereby reducing the bending deformations of the belt pulley 6. The high stiffness and thus the small deformations of the honeycomb 19 are also reflected in the smaller deformations of the dividing rib 14.

The height of the reinforcing ribs 15, i.e. the dimension of the rib in the direction of the axis of the belt pulley 6, increases towards the central part 9 of the belt pulley 6. As the height of the reinforcing ribs 15 or the height of the honeycomb 19 cell walls increases, a higher strength or stiffness of the belt pulley 6 in the central part is achieved, which is required due to the large compressive forces in this area.

The arc-shaped form of the reinforcing ribs 16, 16' in the outer section 13 allows for a good transfer of radial loads and thus small radial deformations of the circumference 10 of the belt pulley 6. At the same time, the arc-shaped ribs 16, 16' in the outer section 13 allow for a good transfer of radial loads resulting from the fit of the belt 8 along the part of the circumference 10 of the belt pulley 6 to the dividing rib 14 and the inner section 12. The shape of the arc-shaped reinforcing ribs 16, 16' in the outer section 13 allows for a good transfer of torque loads during the acceleration and deceleration of the drum 3, as the arc-shaped ribs 16, 16' follow the load on the belt pulley 6 during the acceleration and deceleration of the washing machine drum 3. In this way, axial loads occur mainly in the ribs 15, 16, 16' and there are no bending loads which could result in bending of the reinforcing ribs 15, 16, 16' in the axial direction of the belt pulley 6. With a large number of arc-shaped reinforcing ribs 16, 16' and consequently smaller openings or air channels between the ribs 16, 16' in the outer section 13, a more even air flow is achieved between the belt pulley 6 and the tub 2 of the washing machine during the rotation of the belt pulley 6, which results in a lower aerodynamic noise.

The invention claimed is:

1. A belt pulley of a washing machine drum, particularly of a household washing machine, made of a plastic material, which comprises a central part of the belt pulley formed as a hub, with which the belt pulley is fastened to a drum shaft; a belt pulley circumference arranged concentrically with respect to the hub and receiving a belt on its outer surface; a substantially circular dividing rib arranged concentrically with respect to the circumference of the belt pulley so as to divide the belt pulley into two concentric sections, i.e. a first, inner section closer to the hub, and a second, outer section delimited by the circumference of the belt pulley, wherein a respective plurality of reinforcing ribs are arranged in the inner and outer sections, characterized in
that the dividing rib is arranged on a line of a polygon having the centre in the belt pulley axis and exhibiting corners, into which, from a side facing the hub, a portion of the reinforcing ribs lying the furthest away from the hub lead, said ribs being part of a plurality of reinforcing ribs of the inner section, wherein at least a portion of the reinforcing ribs leading into the corners of the dividing rib extend along a line of polygons which are in the shape of hexagons and radially arranged in the inner section and in contact with each other along one of their sides,
that from at least one said corner of the dividing rib on the side facing the circumference, at least one arc-shaped reinforcing rib originates, the free end of which contacts the circumference of the belt pulley.

2. A belt pulley according to claim 1, characterized in that from at least one corner of the dividing rib on the side facing the circumference, two arc-shaped reinforcing ribs of the outer section originate, forming a pair of mirrored arc-shaped reinforcing ribs and their free ends contacting the circumference of the belt pulley.

3. A belt pulley according to claim 1, characterized in that the dividing rib is arranged concentrically with respect to the circumference of the belt pulley at ⅓ to ⅔ of the radius of the circumference of the belt pulley, preferably at substantially half the radius of the circumference of the belt pulley.

4. A belt pulley according to claim 1, characterized in that the reinforcing ribs of the inner section running along the line of the polygons form a honeycomb.

5. A belt pulley according to claim 4, characterized in that the size of the cells of the honeycomb increases with their distance from the axis of the belt pulley.

6. A belt pulley according to claim 1, characterized in that the size of the radius of the arc-shaped reinforcing rib is substantially equal to or larger than the radius of the belt pulley.

7. A belt pulley according to claim 2 characterized in that a second pair of arc-shaped reinforcing ribs is axially mirrored to a pair of arc-shaped reinforcing ribs of the outer section.

8. A belt pulley according to claim 1, characterized in that the heights of the reinforcing ribs that extend in the direction of the axis of the belt pulley, increase towards the central part of the belt pulley.

9. A belt pulley according to claim 1, characterized in that the number of pairs of arc-shaped reinforcing ribs in the outer section is equal to the number of corners of the dividing rib.

* * * * *